United States Patent

Bauer et al.

[11] Patent Number: 5,927,967
[45] Date of Patent: Jul. 27, 1999

[54] METHOD OF REMOVING SULPHUR DIOXIDE FROM CEMENT KILN EXHAUST GASES

[75] Inventors: Klaus Bauer, Ulm; Jürgen Thormann, Bernburg; Ludger Lohnherr, Oelde, all of Germany

[73] Assignee: E. Schwenk Baustoffwerke KG, Ulm, Germany

[21] Appl. No.: 08/974,723

[22] Filed: Nov. 19, 1997

[30] Foreign Application Priority Data

Nov. 29, 1996 [DE] Germany .................. 196 49 663

[51] Int. Cl.$^6$ .................................................. F23J 17/00
[52] U.S. Cl. ................................................ 432/72; 432/106
[58] Field of Search ................................ 432/61, 66, 72, 432/105, 106

[56] References Cited

U.S. PATENT DOCUMENTS

| | | | |
|---|---|---|---|
| 3,973,980 | 8/1976 | Rohrbach et al. | 432/14 |
| 4,229,226 | 10/1980 | Abelitis | 106/100 |
| 4,634,583 | 1/1987 | Wolter et al. | 423/244 |
| 5,169,611 | 12/1992 | Kupper et al. | 423/210 |
| 5,264,013 | 11/1993 | Brentrup | 432/69 |

FOREIGN PATENT DOCUMENTS

3643143A1 of 0000 Germany .

*Primary Examiner*—Teresa Walberg
*Assistant Examiner*—Gregory A. Wilson
*Attorney, Agent, or Firm*—Reising, Ethington, Barnes, Kisselle, Learman & McCulloch, P.C.

[57] ABSTRACT

A method of removing sulphur dioxide from exhaust gases generated in the production of cement wherein cement raw meal is preheated, ground, and burned in a kiln to form cement clinker which subsequently is cooled and ground. Grinding of the clinker is performed in the presence of preheater exhaust gases containing sulphur dioxide, the cement particles absorbing sulphur dioxide from such exhaust gases.

17 Claims, 2 Drawing Sheets

METHOD OF REMOVING SULPHUR DIOXIDE FROM CEMENT KILN EXHAUST GASES

The invention relates to a method of removing sulphur dioxide ($SO_2$) from the exhaust gases of a kiln installation which serves for the production of cement, such installation including a kiln, a raw meal preheater upstream of the kiln, and a clinker cooler downstream of the kiln, and wherein the raw meal to be fed to the preheater is delivered from a raw material grinding installation and cooled cement clinker is ground in a cement grinding installation.

BACKGROUND OF THE INVENTION

Various embodiments of such installations are known in the art. Depending upon the raw materials processed in the kiln installation and/or the fuels used in the kiln installation, the exhaust gases coming from the raw meal preheater contain a more or less large proportion of $SO_2$. Since the filter arrangements which are generally downstream of the raw meal preheater in the gas flow direction and are, for example, constructed as electrostatic filters, are not normally suitable in order sufficiently to reduce the discharge of $SO_2$ into the atmosphere, it is also known for example to pass exhaust gases from the preheater through the raw-grinding mill of the raw material grinding installation in order to absorb $SO_2$ fractions from the cement raw meal. However, the absorption effect of $SO_2$ on the cement raw meal has frequently proved to be too low.

It is also known from DE-A-36 43 143 for harmful substances such as sulphur, chlorine and fluorine to be removed from the exhaust gases from a cement production plant by bringing the exhaust gases from the preheater into contact in a reaction zone with raw meal, partially deacidified raw meal and/or with partially deacidified slaked raw meal in order to fix them thoroughly therein. The solid material contained in the gas stream is then removed from the gas in a precipitation zone downstream of the reaction zone.

The object of the invention is to provide a method for removing $SO_2$ from kiln exhaust gases and which is distinguished—by comparison with the known methods—by the use of relatively simple measures in terms of apparatus by a markedly improved precipitation of sulphur dioxide ($SO_2$) and optionally other similar harmful substances out of the exhaust gases from the said kiln installation.

SUMMARY OF THE INVENTION

In the tests on which the invention is based it has been shown that the absorption effect of material particles in relation to $SO_2$ is all the better the greater the specific surface area ($cm^2/g$) of the material particles is with which the gases containing $SO_2$ are brought into contact. The invention utilises this fact in that at least a part-stream of the exhaust gases from the raw meal preheater is passed through the cement grinding installation and as it does so sulphur dioxide ($SO_2$) from the exhaust gases is absorbed by the cement particles. In this case it should be stressed that the specific surface area of the cement raw meal comminuted in the raw material grinding installation is lower than the specific surface area of the clinker ground in the cement grinding installation (including any additional components). Accordingly due to the passage of exhaust gases from the preheater through the cement grinding installation these exhaust gases are brought into very intimate contact with the cement particles ground in the cement grinding installation, so that a particularly high absorption or removal of $SO_2$ from the exhaust gases from the preheater by the cement particles can be achieved which is markedly improved over the known method mentioned in the introduction. Thus whilst in the known method mentioned in the introduction the exhaust gases from the preheater are passed through the raw material grinding installation, in the method according to the invention by contrast at least a part-stream of the exhaust gases from the preheater is passed through the cement grinding installation with the result that a marked improvement in the $SO_2$ precipitation from the exhaust gases from the preheater can be achieved.

From the point of view of apparatus it is frequently possible to bring this about by simple alterations in the way the corresponding conveying arrangements or pipes run.

The exhaust gases from the preheater to be delivered to the cement grinding installation are advantageously cooled to a predetermined exhaust gas temperature of the cement grinding installation. This cooling can take place by measures or equipment which are known per se. Thus these exhaust gases from the preheater or the corresponding part-stream can be passed through at least one cooling tower—also usually used in previously known installations—and/or at least one air heat exchanger and cooled therein.

In a manner which is known per se the cement grinding installation contains at least one cement mill. In this case it is regarded as particularly advantageous if the exhaust gases from the preheater which are to be delivered to the cement grinding installation are cooled to a temperature close to their dew point, the exhaust gas temperature of the cement mill being set to a temperature in the region of approximately 70° C.

Accordingly these exhaust gases from the preheater can be cooled to the lowest possible temperature so that the exhaust gas temperature of the cement mill can be set to approximately 70° C. and thus this temperature lies as close as possible to the dew point of these exhaust gases from the mill, which for its part should be relatively high. These measures also contribute particularly advantageously to a very effective $SO_2$ absorption from the exhaust gases from the preheater with the aid of cement or clinker meal.

In this method according to the invention it has also proved advantageous if a roll mill (or roller grinding mill) is used as the cement mill (in the cement grinding installation) and at least the major proportion of the exhaust gases from the preheater is passed through it. These roll mills may be used particularly favourably and economically in order to utilise as much as possible of the exhaust gases from the preheater, optionally all the exhaust gases from the preheater, for an effective finish grinding of the cement clinker (including necessary additives).

Furthermore it may be particularly advantageous to spray a predetermined adjustable quantity of water into the cement mill, by which means it is frequently possible to achieve a further improvement in the $SO_2$ absorption in the cement mill.

In the latter case—depending upon the residual moisture content of the finished clinker meal or cement—it may be necessary to remove an excess moisture content from the cement. According to a further advantageous embodiment of the invention this can be achieved by the use of a roll mill for pre-grinding the cement clinker, spraying the water into this roll mill and then finish-grinding the pre-ground cement clinker in a subsequent tube mill or ball mill whilst simultaneously driving residual moisture (water) from the mill feed material. Thus at least this finish grinding can be carried out as a type of drying and grinding process.

In so far as the raw material grinding installation is concerned, this may contain—as is known per se—at least one raw-grinding mill, e.g. also a roll mill (roller grinding mill) or also a tube mill or other comminuting arrangement suitable as a raw-grinding mill. According to the invention it is regarded as particularly advantageous in this case if heated exhaust gases from the clinker cooler are delivered as drying gases to the or each raw-grinding mill operated according to the principle of drying and grinding. In the event that insufficient heated exhaust gases from the cooler are available, then there are various possibilities for supplying additional drying gases. Thus it may be particularly advantageous according to the invention to deliver a residual part-stream of the exhaust gases from the preheater, that is to say the exhaust gases from the preheater which are not passed through the cement grinding installation, directly to the raw-grinding mill as additional drying gases. Another advantageous possibility consists of using fresh air as the additional drying gas required in the raw-grinding mill, this fresh air having previously been indirectly preheated in at least one air heat exchanger by the exhaust gases from the raw meal preheater, and at the same time the part-stream of exhaust gas to be delivered to the cement grinding installation can be cooled by this heat exchange. Thus in the last mentioned possibility of delivering additional drying gas to the raw-grinding mill only the heat potential of the exhaust gases from the preheater is utilised for heating fresh air, without the exhaust gases from the preheater being themselves passed through the raw-grinding mill. In this case a desired cooling of the preheater exhaust gas temperature can additionally be achieved.

THE DRAWINGS

The invention will be further explained below with reference to some examples of complete installations which are illustrated in the drawings and are particularly suitable for carrying out the method. In these drawings.

DETAILED DESCRIPTION

Figure 1:
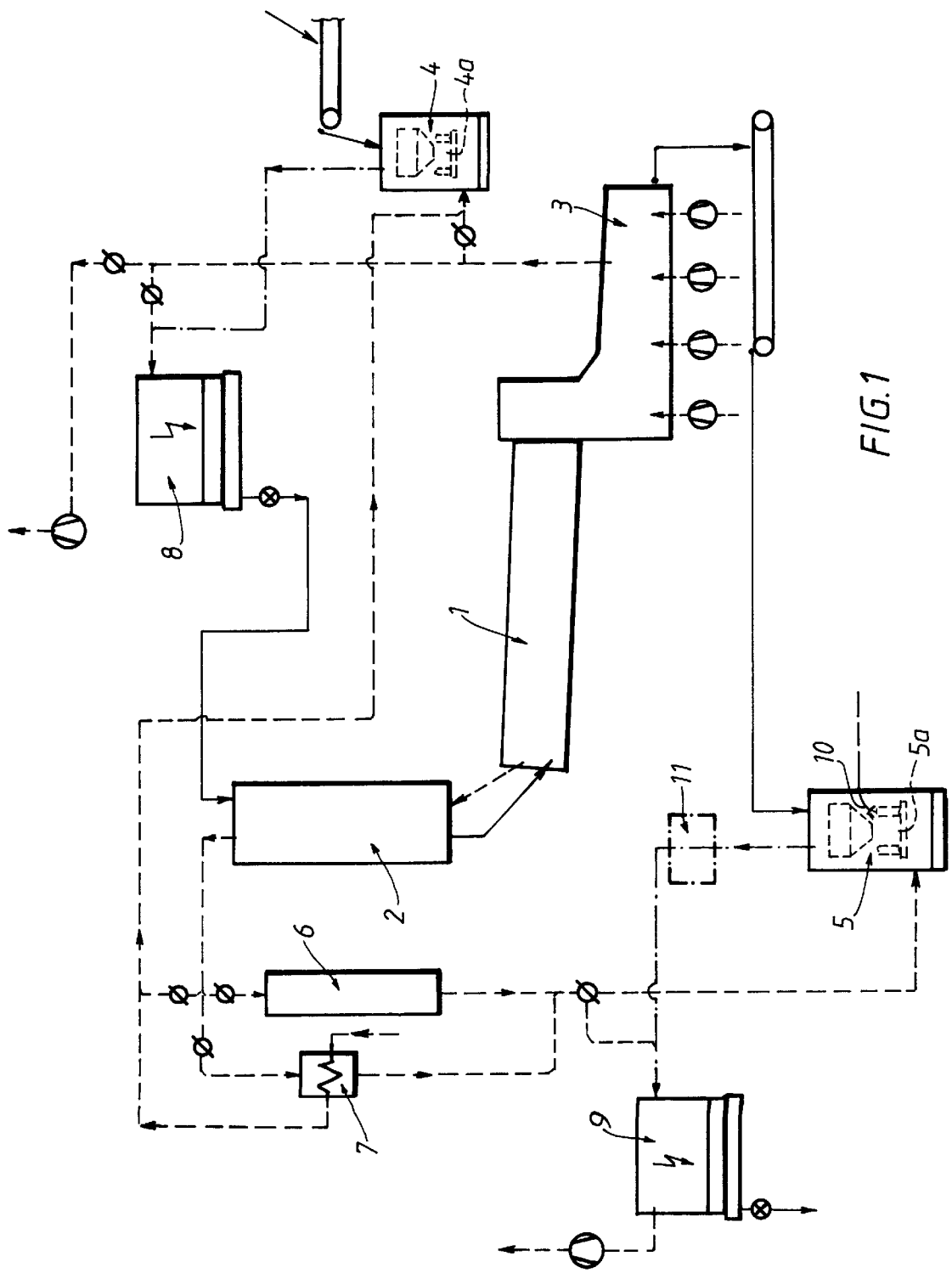
FIG. 1 shows a flow diagram of a first example of the apparatus, largely as a block diagram.

The principal apparatus or apparatus parts for carrying out the method according to the invention will be explained in somewhat general terms with reference to the block flow diagram shown in FIG. 1. According to this the complete installation contains first of all a kiln installation which serves for the cement production with a rotary kiln 1 serving as kiln, a raw meal preheater 2 disposed upstream of this rotary kiln 1 in terms of the material transport, and a clinker cooler 3 disposed downstream of the rotary kiln 1. Further essential parts of the complete apparatus are a raw material grinding installation 4, a cement grinding installation 5, a cooling tower 6 and at least one air heat exchanger 7, a first filter arrangement (e.g. an electrostatic filter) 8 of the raw material grinding installation 4 and a second filter arrangement (e.g. likewise an electrostatic filter) 9 is associated jointly with the cement grinding installation 5 and the raw meal preheater 2. Furthermore, it may be seen in FIG. 1 that the various installations or apparatus parts may be connected to one another in a reasonable way, broken lines essentially denoting gas pipes, solid lines material pipes and dash-dot lines pipes for mixtures of gas and material. Some of the aforementioned pipes have changeover or throttle valves disposed in this in an advantageous manner so that various ways of running the pipes (including various combinations) can be selected or set within the context of the method according to the invention.

In so far as the construction of the grinding installations is concerned, these may in fact generally be formed by any suitable construction of a grinding installation; however, it is particularly preferred that the raw material grinding installation contains at least one raw-grinding mill 4a in the form of a roll mill (roller grinding mill) with an air separator installed above it (as is known per se) and the cement grinding installation likewise contains at least one cement mill 5a in the form of a roll mill (or roller grinding mill) with an air separator installed above it.

On the basis of the preceding explanations, with the apparatus according to FIG. 1 it is possible without difficulties to carry out the method described in detail above for removal of $SO_2$ from the exhaust gases from the raw meal preheater 2, as it is with the various variants which are also explained.

Thus if one considers the block flow diagram in FIG. 1, then it may be seen that at least a part-stream of the exhaust gases from the raw meal preheater 2 can be passed through the cement grinding installation 5—according to the pipe runs shown by broken lines—in order thereby for $SO_2$ to be absorbed by the cement particles from these exhaust gases from the preheater. The raw-grinding mill 4a of the raw material grinding installation 4 is operated according to the principle of drying and grinding, and heated exhaust gases from the clinker cooler 3 are principally delivered to it as drying gases. Should these prove insufficient, then there is the possibility of introducing a residual part-stream of the exhaust gases from the raw meal preheater 2 into the raw-grinding mill 4a as additional drying gases. Alternatively or optionally in combination therewith there is also the possibility of supplying drying gas additionally required in the raw-grinding mill 4a by fresh air which has previously been indirectly preheated in the air heat exchanger 7 by exhaust gases from the preheater. In this case the part-stream of exhaust gas brought in for this heat exchange is cooled so that with sufficient cooling it can be introduced directly into the cement grinding installation 5.

The exhaust gases from the preheater which are to be delivered to the cement grinding installation should generally—as already mentioned above—be cooled, and in fact should advantageously be cooled to a temperature near the dew point of these exhaust gases, the exhaust gas temperature of the cement mill 5a being advantageously set to approximately 70° C.

In FIG. 1 a water injection arrangement 10 is indicated by broken lines on the cement grinding installation 5, and by means of this arrangement water can be sprayed in if required into the cement mill 5a in order to achieve an improvement in the $SO_2$ absorption. If it should be necessary in this case—according to the residual moisture of the ground cement—to drive out a residual moisture fraction from the ground cement, then the cement grinding installation may be designed so that the cement mill (roll mill) 5a is used to a certain extent as a type of primary mill from which the pre-ground cement is passed on to a tube mill 11 for finish grinding.

With reference to the necessary cooling of the part-stream of the exhaust gases from the preheater which is to be delivered to the cement grinding installation 5 it should also be mentioned that for this at least one cooling tower 6 and/or—as already mentioned—at least one air heat exchanger 7 can be used.

Figure 2:
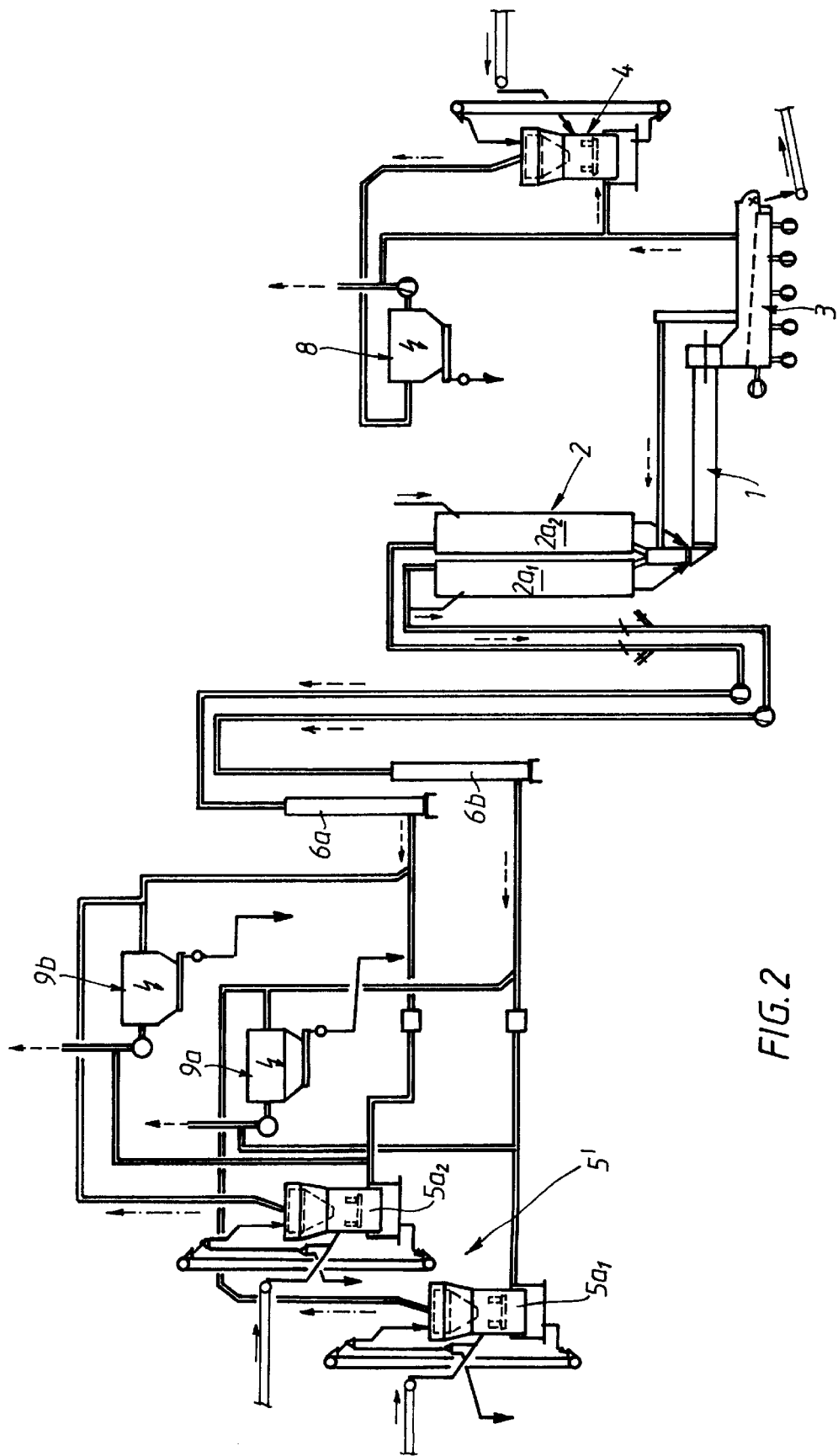
FIG. 2 shows a flow diagram for a second example of the apparatus in which the cement grinding installation contains two cement mills.

The second embodiment of apparatus for carrying out the method according to the invention which is illustrated with the aid of the flow diagram according to FIG. 2 differs from the first embodiment principally in the fact that the cement grinding installation 5' contains two cement mills $5a_1$ and $5a_2$ which are, however, preferably again constructed in the form of a roll mill with an air separator disposed immediately thereabove.

The two cement mills $5a_1$ and $5a_2$ are each supplied parallel with one another with a part-stream of the exhaust gases from the preheater 2' and with part-quantities of the cement clinker cooled in the clinker cooler 3. In this connection it should be mentioned that the double lines illustrated in FIG. 2 denote pipes for conveying gases (according to the broken arrows) or for conveying mixtures of gas and material (according to the dash-dot arrows) and the thick solid lines denote pipes for conveying material, i.e. raw material, cement raw meal, cement clinker and finished cement.

In FIG. 2 it is also shown that the raw meal preheater 2' can be constructed in the form of a suspension preheater, particularly a multi-stage cyclone preheater, and contains two preheating sections $2a_1$ and $2a_2$ disposed parallel alongside one another, of which each is connected by way of an exhaust gas branch pipe with appertaining cooling tower 6a or 6b respectively to one of the two cement mills $5a_1$ or $5a_2$ respectively. Thus each part-stream of the exhaust gases from the preheater is again passed through the cement grinding installation 5' or through the appertaining cement mill, so that in this case too $SO_2$ can be absorbed by the cement particles from the exhaust gases from the preheater in a manner according to the invention.

In this second embodiment of apparatus according to FIG. 2 it is also regarded as advantageous to co-ordinate with each of the two cement mills $5a_1$ and $5a_2$ a separate filter (electrostatic filter) 9a or 9b respectively which, following the first embodiment of apparatus (FIG. 1) is also provided for a corresponding proportion of the exhaust gases from the corresponding preheater section $2a_1$ or $2a_2$ respectively.

The use of a cement grinding installation 5' according to FIG. 2 with two cement mills $5a_1$ and $5a_2$ as well as appertaining filter 9a or 9b respectively has the advantage of better availability or flexibility of the total plant. This is advantageous for example when at times of particularly high current consumption, a reduction in the total plant consumption might be necessary in certain circumstances, for which purpose one cement mill with appertaining other equipment can be switched off. This embodiment of apparatus offers a further advantage when a cement mill must be switched off because of maintenance work or for replacement of wearing parts.

We claim:

1. A method of removing sulphur dioxide from exhaust gases generated in the production of cement comprising:
   a) grinding raw cement meal containing at least some sulphur in a raw cement meal grinder;
   b) preheating ground raw cement meal in a preheater and thereby generating exhaust gases containing sulphur dioxide;
   c) burning the preheated meal in a kiln to produce cement clinker;
   d) cooling the cement clinker in a cooler; and
   e) grinding cooled cement clinker in at least one cement clinker grinder in the presence of exhaust gases from said preheater to produce cement particles which absorb sulfur dioxide from said exhaust gases.

2. The method according to claim 1 including cooling the exhaust gases upstream of said cement clinker grinder to a temperature having a selected value with reference to the temperature of exhaust gases in said cement clinker grinder.

3. The method according to claim 1 wherein said exhaust gases are cooled by passing them through at least one cooling tower.

4. The method according to claim 1 wherein said exhaust gases are cooled by passing them through at least one air heat exchanger.

5. The method according to claim 1 including maintaining the temperature of exhaust gases in said cement clinker grinder at about 70° C. and cooling the exhaust gases upstream of said cement clinker grinder to a temperature near the dew point of said exhaust gases.

6. The method according to claim 5 wherein a majority of the exhaust gases from said preheater are passed through said cement clinker grinder.

7. The method according to claim 1 including spraying water into said cement clinker grinder.

8. The method according to claim 1 wherein the grinding of said cement clinker is performed in two grinding stages in the first of which the clinker is preground in a roll mill and in the second of which the preground clinker is finish ground in a tube mill.

9. The method according to claim 8 including spraying water into said roll mill.

10. The method according to claim 9 including driving residual moisture from said cement clinker during finish grinding thereof.

11. The method according to claim 1 wherein the grinding of said cement clinker is performed in two grinders each of which is supplied with a portion of said cooled cement clinker and a portion of said exhaust gases.

12. The method according to claim 11 wherein each of said cement clinker grinders comprises a roll mill.

13. The method according to claim 1 wherein the cooling of said cement clinker produces hot gases in said cooler, and wherein hot gases from said cooler are delivered to said raw cement meal grinder during grinding of said raw cement meal.

14. The method according to claim 13 including delivering a portion of the exhaust gases from said preheater to said raw cement meal grinder during grinding of said raw cement meal.

15. The method according to claim 1 including delivering a portion of the exhaust gases from said preheater to said raw cement meal grinder during grinding of said raw cement meal.

16. The method according to claim 1 including delivering heated fresh air to said raw cement meal grinder during grinding of said raw cement meal.

17. The method according to claim 16 including heating the fresh air delivered to said raw cement meal grinder by heat from the exhaust gases from said raw cement meal preheater.

* * * * *